US012562614B2

(12) United States Patent
Saranadhi

(10) Patent No.: US 12,562,614 B2
(45) Date of Patent: Feb. 24, 2026

(54) STRUCTURAL STATOR CORE

(71) Applicant: Wisk Aero LLC, Mountain View, CA (US)

(72) Inventor: Dhananjai Saranadhi, Fremont, CA (US)

(73) Assignee: Wisk Aero LLC, Mountain View, CA (US)

( * ) Notice: Subject to any disclaimer, the term of this patent is extended or adjusted under 35 U.S.C. 154(b) by 116 days.

(21) Appl. No.: 18/467,586

(22) Filed: Sep. 14, 2023

(65) Prior Publication Data

US 2024/0097521 A1 Mar. 21, 2024

Related U.S. Application Data

(60) Provisional application No. 63/407,117, filed on Sep. 15, 2022.

(51) Int. Cl.
| | |
|---|---|
| *H02K 5/16* | (2006.01) |
| *B64D 27/24* | (2024.01) |
| *H02K 1/18* | (2006.01) |
| *H02K 5/18* | (2006.01) |
| *H02K 7/08* | (2006.01) |
| *H02K 21/14* | (2006.01) |

(52) U.S. Cl.
CPC ............. *H02K 5/161* (2013.01); *B64D 27/24* (2013.01); *H02K 1/185* (2013.01); *H02K 5/18* (2013.01); *H02K 7/083* (2013.01); *H02K 21/14* (2013.01)

(58) Field of Classification Search
CPC .......... H02K 5/161; H02K 1/185; H02K 5/18; H02K 7/083; H02K 21/14; B64D 27/24
See application file for complete search history.

(56) References Cited

U.S. PATENT DOCUMENTS

| | | | | |
|---|---|---|---|---|
| 10,131,426 | B2 * | 11/2018 | Judas | ........................ B64C 3/38 |
| 2021/0249936 | A1 * | 8/2021 | Chen | ........................ H02K 9/20 |

FOREIGN PATENT DOCUMENTS

| | | | | |
|---|---|---|---|---|
| CN | 109995190 A | * | 7/2019 | ............... H02K 5/18 |
| CN | 113978718 A | * | 1/2022 | ............. B64C 29/00 |
| CN | 113978718 B | | 3/2022 | |
| EP | 0503093 A1 | * | 9/1992 | ............. H02K 9/197 |

OTHER PUBLICATIONS

CN-113978718-A_translate (Year: 2022).*
CN-109995190-A_translate (Year: 2019).*
PCT/US2023/032711 , "International Search Report and Written Opinion", Dec. 26, 2023, 12 pages.

* cited by examiner

*Primary Examiner* — Tulsidas C Patel
*Assistant Examiner* — Mohammed Ahmed Qureshi
(74) *Attorney, Agent, or Firm* — Kilpatrick Townsend & Stockton LLP

(57) ABSTRACT

Electric motors and related methods employ a stator assembly as part of a housing assembly that reacts output shaft loads to a mounting base. An electric motor includes an output shaft, a rotor coupled to the output shaft, a first housing, a first bearing assembly coupled to the first housing, a second housing, a second bearing assembly coupled to the second housing, and a stator assembly. The stator assembly includes a structural stator core member and stator coils. The structural stator core member extends circumferentially around the output shaft. The second housing is coupled to the first housing by the stator core.

16 Claims, 6 Drawing Sheets

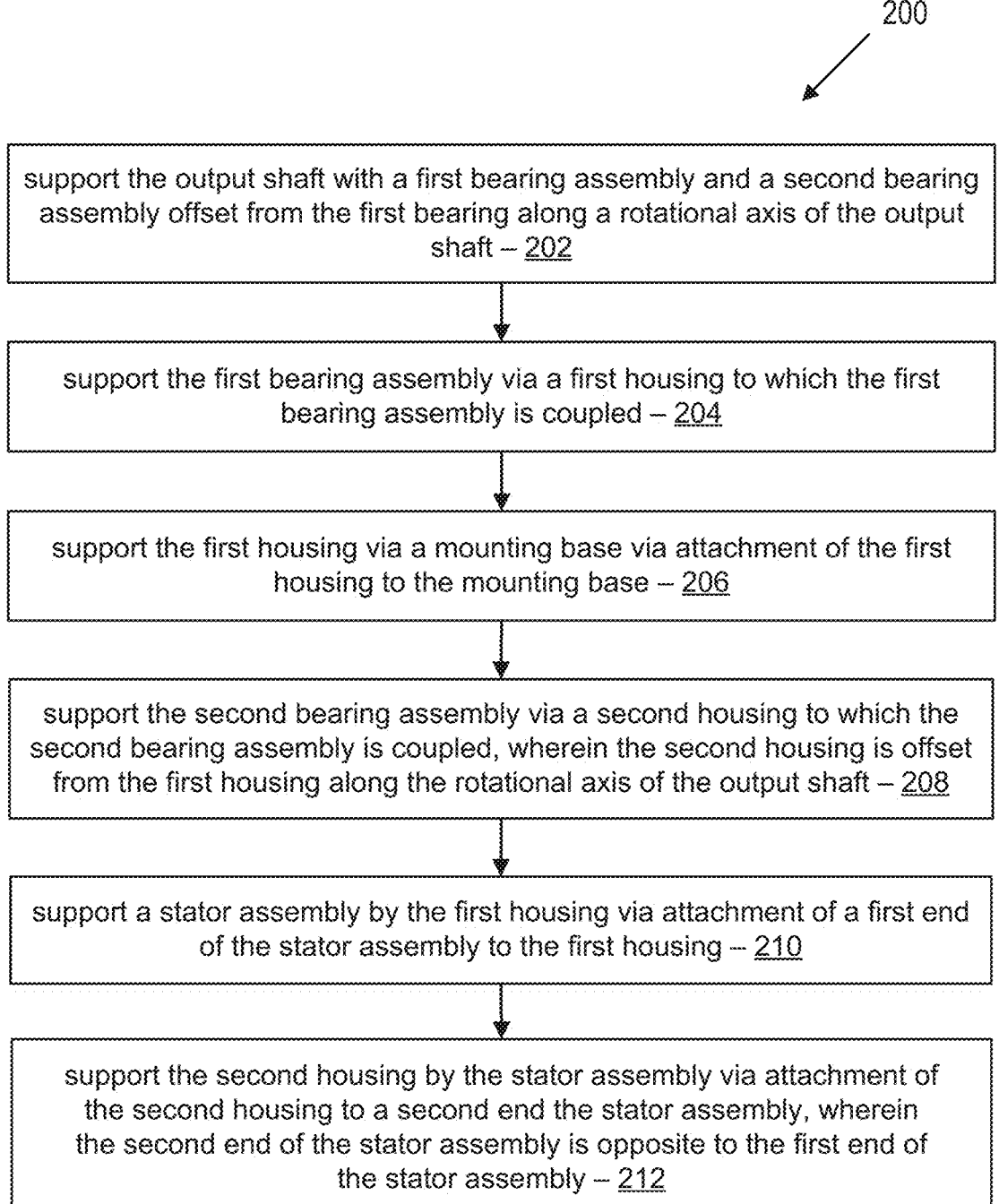

200 support the output shaft with a first bearing assembly and a second bearing assembly offset from the first bearing along a rotational axis of the output shaft – 202 support the first bearing assembly via a first housing to which the first bearing assembly is coupled – 204 support the first housing via a mounting base via attachment of the first housing to the mounting base – 206 support the second bearing assembly via a second housing to which the second bearing assembly is coupled, wherein the second housing is offset from the first housing along the rotational axis of the output shaft – 208 support a stator assembly by the first housing via attachment of a first end of the stator assembly to the first housing – 210 support the second housing by the stator assembly via attachment of the second housing to a second end the stator assembly, wherein the second end of the stator assembly is opposite to the first end of the stator assembly – 212

FIG. 4

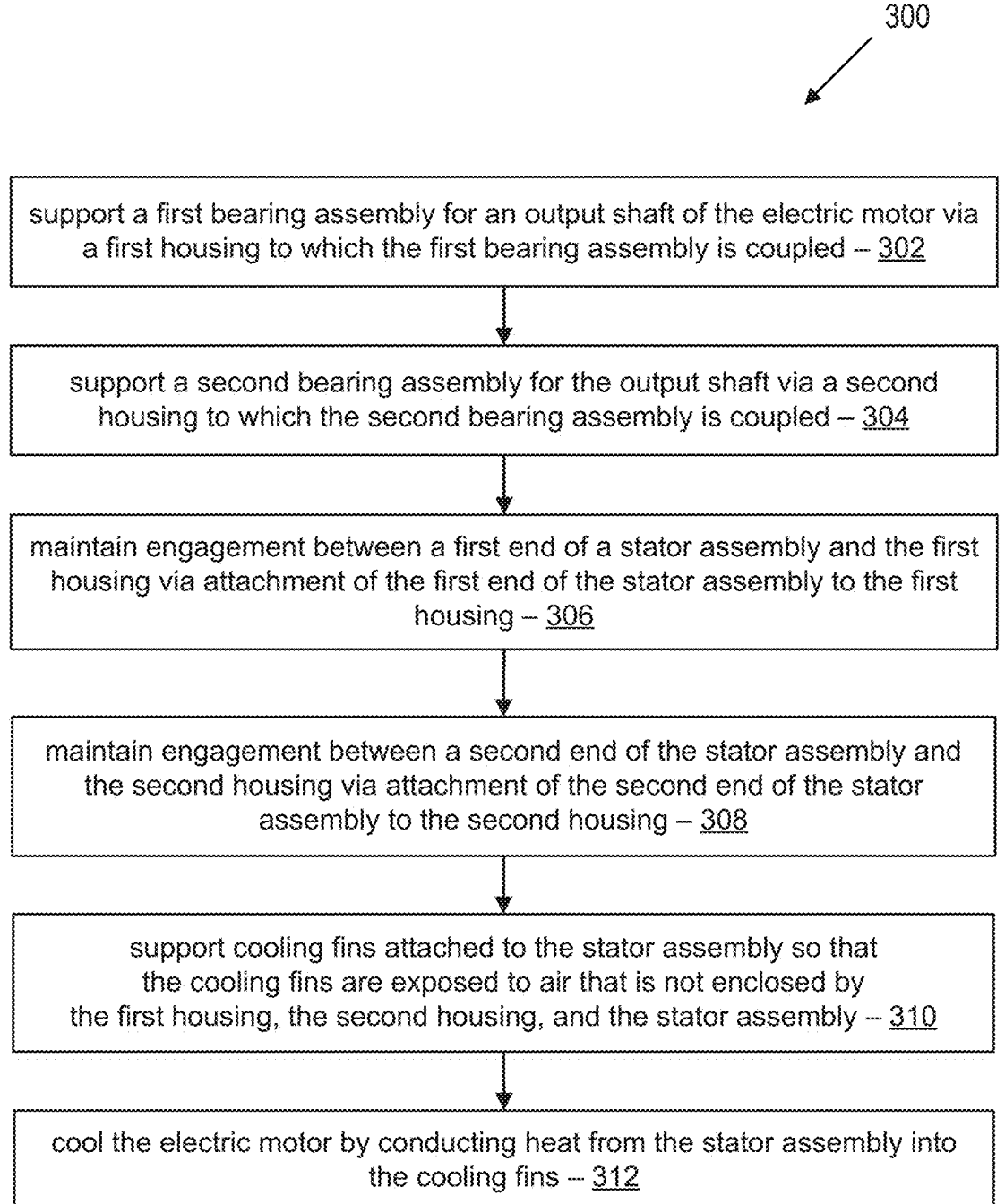

300 support a first bearing assembly for an output shaft of the electric motor via a first housing to which the first bearing assembly is coupled – 302 support a second bearing assembly for the output shaft via a second housing to which the second bearing assembly is coupled – 304 maintain engagement between a first end of a stator assembly and the first housing via attachment of the first end of the stator assembly to the first housing – 306 maintain engagement between a second end of the stator assembly and the second housing via attachment of the second end of the stator assembly to the second housing – 308 support cooling fins attached to the stator assembly so that the cooling fins are exposed to air that is not enclosed by the first housing, the second housing, and the stator assembly – 310 cool the electric motor by conducting heat from the stator assembly into the cooling fins – 312

FIG. 5

STRUCTURAL STATOR CORE

CROSS-REFERENCE TO RELATED APPLICATIONS

This application claims priority to U.S. Provisional Application No. 63/407,117, filed Sep. 15, 2022, the disclosure of which is incorporated herein by reference.

BACKGROUND

Electric motors typically include a housing assembly, an output shaft, a rotor, and a stator. The housing assembly includes bearings that support the output shaft. The rotor is attached to the output shaft. The stator typically includes coils with each of the coils wrapped around one or more magnetically permeable core members. Drive currents are typically applied to the coils to generate magnetic fields used to drive rotation of the rotor, thereby driving rotation of the output shaft.

The usage of electric motors in many applications is increasing at a substantial rate. For example, electric motors are increasingly employed in vehicles, such as cars and trucks. Recently, electric motors are increasingly employed in aerial vehicles. In many vehicles, and especially in aerial vehicles, electric motors having an increased power to weight ratio are of interest due to the beneficial impact on vehicle efficiency and/or capability.

BRIEF SUMMARY

The following presents a simplified summary of some embodiments of the invention to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments described herein are directed to electric motors that include a structural stator core forming a portion of a housing assembly that supports an output shaft of the electric motor. In many embodiments, the structural stator core includes stator-to-housing attachment features via which the structural stator core is attached to and between two housing members. The structural stator core transfers loads between the two housing members. By employing the structural stator core as part of the housing assembly, the overall weight of the electric motor can be reduced. Additionally, since the outer circumferential wall of the stator core can be exposed, cooling fins can be attached directly to the structural stator core. Accordingly, using the structural stator core as part of the housing assembly accommodates reduced weight of the electric motor and/or improved cooling of the electric motor.

Thus, in one aspect, an electric motor includes an output shaft, a rotor, a first housing, a first bearing assembly, a second housing, a second bearing assembly, and a stator assembly. The output shaft is configured for rotation around an output shaft rotational axis. The rotor is coupled to the output shaft. The first housing includes first housing-to-stator attachment features. The first bearing assembly is coupled to the first housing and interfaced with a first section of the output shaft. The second housing includes second housing-to-stator attachment features. The second bearing assembly is coupled to the second housing and interfaced with a second section the output shaft. The stator assembly includes a stator core and stator coils. The stator core includes a stator back iron, stator teeth, and stator-to-housing attachment features. The second housing is coupled to the first housing by the stator core via the second housing-to-stator attachment features, the first housing-to-stator attachment features, and the stator-to-housing attachment features. The stator back iron extends circumferentially around the output shaft rotational axis. The stator back iron is configured to react one or more interface forces applied to the second bearing assembly by the second section of the output shaft to the first housing. Each of the stator teeth extend radially inward toward the output shaft rotational axis from the stator back iron. Each of the stator coils extends circumferentially around a respective one of the stator teeth.

In some embodiments of the electric motor, one of the first and second bearing assemblies is configured to react both radial and thrust loads and the other of the first and second bearing assemblies is configured to react only radial loads. For example, in some embodiment of the electric motor, the first bearing assembly is configured to react one or more first bearing assembly radial loads from the first section of the output shaft into the first housing, wherein each of the one or more first bearing assembly radial loads is oriented radially relative to the output shaft rotational axis. The first bearing assembly can also be configured to react a thrust load from the output shaft into the first housing, wherein the thrust load is aligned with the output shaft rotational axis. The second bearing assembly can be configured to react one or more second bearing assembly radial loads from the second section of the output shaft into the second housing, wherein each of the one or more second bearing assembly radial loads is oriented radially relative to the output shaft rotational axis. The first housing can include one or more motor mounting features configured for mounting the electric motor to a mounting base.

In many embodiments of the electric motor, the stator core is attached to and between the first housing and the second housing. For example, in some embodiments, the electric motor includes stator attachment bolts via which the stator core is attached to and between the first housing and the second housing. The stator-to-housing attachment features can include stator-to-housing attachment fastener holes. The first housing-to-stator attachment features can include first housing-to-stator attachment fastener holes. The second housing-to-stator attachment features can include second housing-to-stator attachment fastener holes. Each of the stator attachment bolts can extend through a respective one of the first housing-to-stator attachment fastener holes, a respective one of the second housing-to-stator attachment fastener holes, and a respective one of the stator-to-housing attachment fastener holes.

Since the stator core is attached to and between each of the first housing and the second housing in many embodiments of the electric motor, the stator core is exposed along an outer perimeter of the electric motor, thereby enabling more direct cooling of the stator core. For example, in many embodiments, the electric motor includes cooling fins attached to an outer-circumferential surface of the stator back iron. The cooling fins can be attached to the outer circumference of the stator back iron using any suitable approach. For example, the cooling fins can be bonded to the outer-circumferential surface via a thermally conductive adhesive.

The rotor of the electric motor can have any suitable configuration. For example, in some embodiments of the electric motor, the rotor includes permanent magnets.

In many embodiments of the electric motor, the stator core is monolithically formed of a magnetically permeable material. The stator back iron, the stator teeth, and the stator-to-housing attachment features can be integrally formed of the magnetically permeable material.

The electric motor can be configured for use in any suitable application. For example, an aircraft can include at least one of the electric motor. The output shaft can be drivingly coupled with any suitable powered assembly of the aircraft. For example, the output shaft can drivingly coupled with a lift fan of the aircraft.

In another aspect, a method of supporting an output shaft of an electric motor employs a structural stator core. The method includes supporting the output shaft with a first bearing assembly and a second bearing assembly offset from the first bearing assembly along a rotational axis of the output shaft. The method further includes supporting the first bearing assembly via a first housing to which the first bearing assembly is coupled. The method further includes supporting the first housing via a mounting base via attachment of the first housing to the mounting base. The method further includes supporting the second bearing assembly via a second housing to which the second bearing assembly is coupled. In many embodiments, the second housing is offset from the first housing along the rotational axis of the output shaft. The method further includes supporting a stator assembly by the first housing via attachment of a first end of the stator assembly to the first housing. The method further includes supporting the second housing by the stator assembly via attachment of the second housing to a second end the stator assembly, wherein the second end of the stator assembly is opposite to the first end of the stator assembly.

In many embodiments of the method of supporting an output shaft of an electric motor, structural loads are transmitted through the stator assembly. For example, in many embodiments, the method further includes transmitting a first bearing assembly load from the output shaft to the mounting base through a first load path that extends through the first bearing assembly and the first housing to the mounting base and transmitting a second bearing assembly load from the output shaft to the mounting base through a second load path that extends through the second bearing assembly, the second housing, the stator assembly, and the first housing to the mounting base. In many embodiments of the method, the second bearing assembly load is oriented radially relative to the rotational axis of the output shaft, the first bearing assembly load includes a radial load component and a thrust load component, the radial load component is oriented radially relative to the rotational axis of the output shaft, and the thrust load component is aligned with the rotational axis of the output shaft.

The stator assembly employed in the method of supporting an output shaft of an electric motor can have any suitable configuration. For example, the stator assembly can include a stator core and stator coils. The stator core can include a stator back iron, stator teeth, and stator-to-housing attachment features. The stator core can be coupled with and between the first housing and the second housing via the stator-to-housing attachment features of the stator core.

The method of supporting an output shaft of an electric motor can be employed in any suitable application. For example, the output shaft of the electric motor can be drivingly coupled with any suitable electrically powered assembly of an aircraft, such as, for example, a lift fan.

In another aspect, a method of cooling an electric motor employs a structural stator core. The method includes supporting a first bearing assembly for an output shaft of the electric motor via a first housing to which the first bearing assembly is coupled. The method further includes supporting a second bearing assembly for the output shaft via a second housing to which the second bearing assembly is coupled. The method further includes maintaining engagement between a first end of a stator assembly and the first housing via attachment of the first end of the stator assembly to the first housing. The method further includes maintaining engagement between a second end of the stator assembly and the second housing via attachment of the second end of the stator assembly to the second housing. The method further includes supporting cooling fins attached to the stator assembly so that the cooling fins are exposed to air that is not enclosed by the first housing, the second housing, and the stator assembly. The method further includes cooling the electric motor by conducting heat from the stator assembly into the cooling fins.

In some embodiments of the method of cooling an electric motor, the stator assembly includes a stator core and stator coils. The stator core can include a stator back iron, stator teeth, and stator-to-housing attachment features. The stator back iron can extend circumferentially around a rotational axis of the output shaft. Each of the first housing and the second housing can be coupled with the stator core via the stator-to-housing attachment features. In some embodiments, the cooling fins are thermally coupled to an outer-circumferential surface of the stator back iron. For example, the cooling fins can be thermally coupled to the outer-circumferential surface of the stator back iron via a thermally conductive adhesive.

For a fuller understanding of the nature and advantages of the present invention, reference should be made to the ensuing detailed description and accompanying drawings.

BRIEF DESCRIPTION OF THE DRAWINGS

FIG. 4 is a simplified block diagram of a method of supporting an output shaft of an electric motor in which a structural stator core member forms part of the support structure for the output shaft, in accordance with embodiments.

FIG. 5 is a simplified block diagram of a method of cooling an electric motor using cooling fins that are attached to a stator assembly of the electric motor, in accordance with embodiments.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

In many existing electric motors, a stator core is enclosed and supported by a housing made from a different material. For example, the housing is often made from aluminum and the stator core is typically made from some suitable magnetically permeable alloy of iron. Heat generated by many existing electric motors is typically transferred via conduction from the stator core into the housing, and from the housing into cooling fins attached to the housing. The housing and the stator core often have different rates of thermal expansion, which may require the usage of thermal interfaces capable of accommodating the different rates of thermal expansion. The usage of thermal interfaces, however, may result in decreased thermal conduction, thereby decreasing cooling of the electric motor, and lowering performance of the electric motor.

Figure 1:
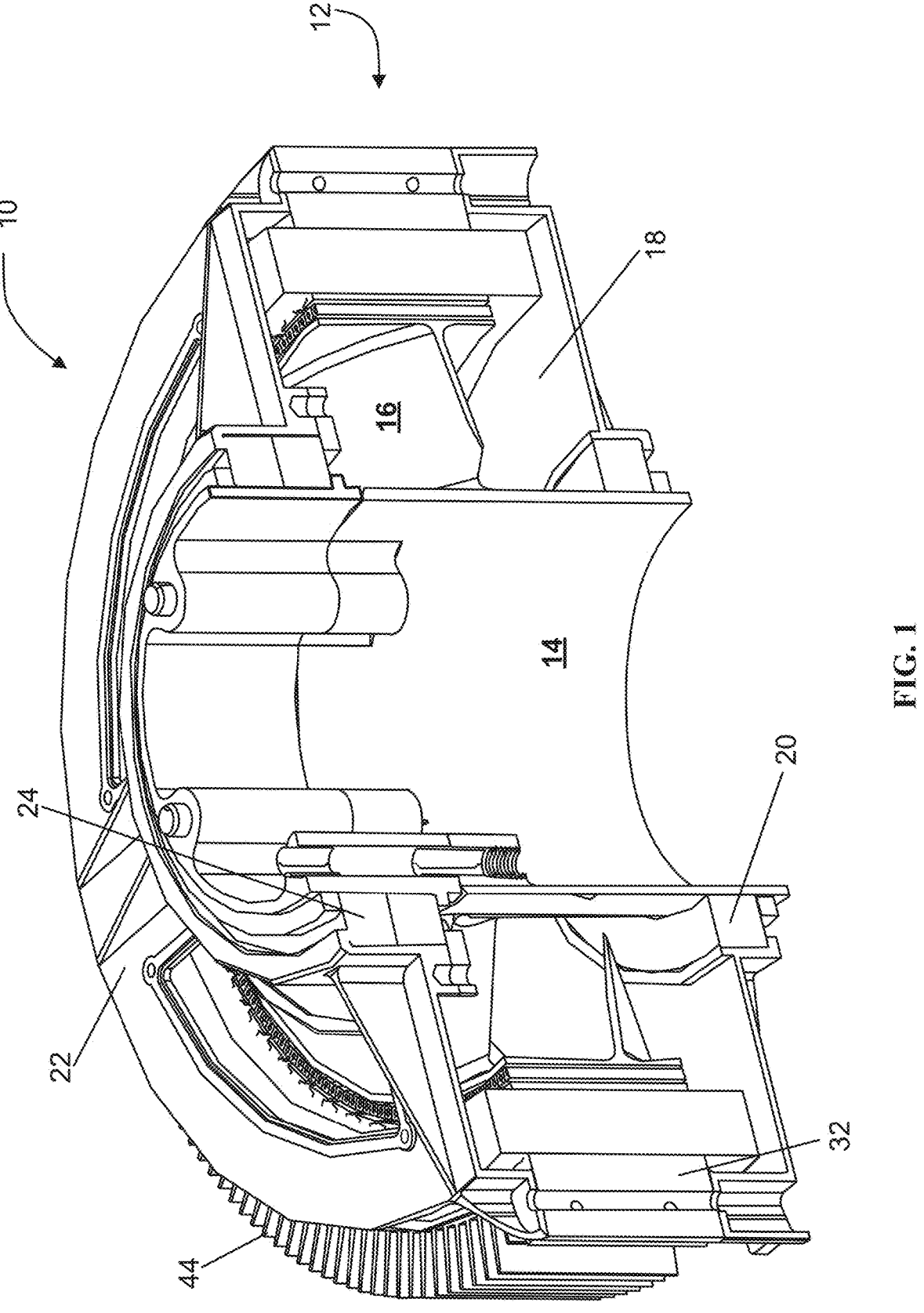
FIG. 1 shows a partial cross-sectional view of an electric motor that includes a structural stator core member that forms a portion of a housing assembly of the electric motor, in accordance with embodiments.
Figure 2:
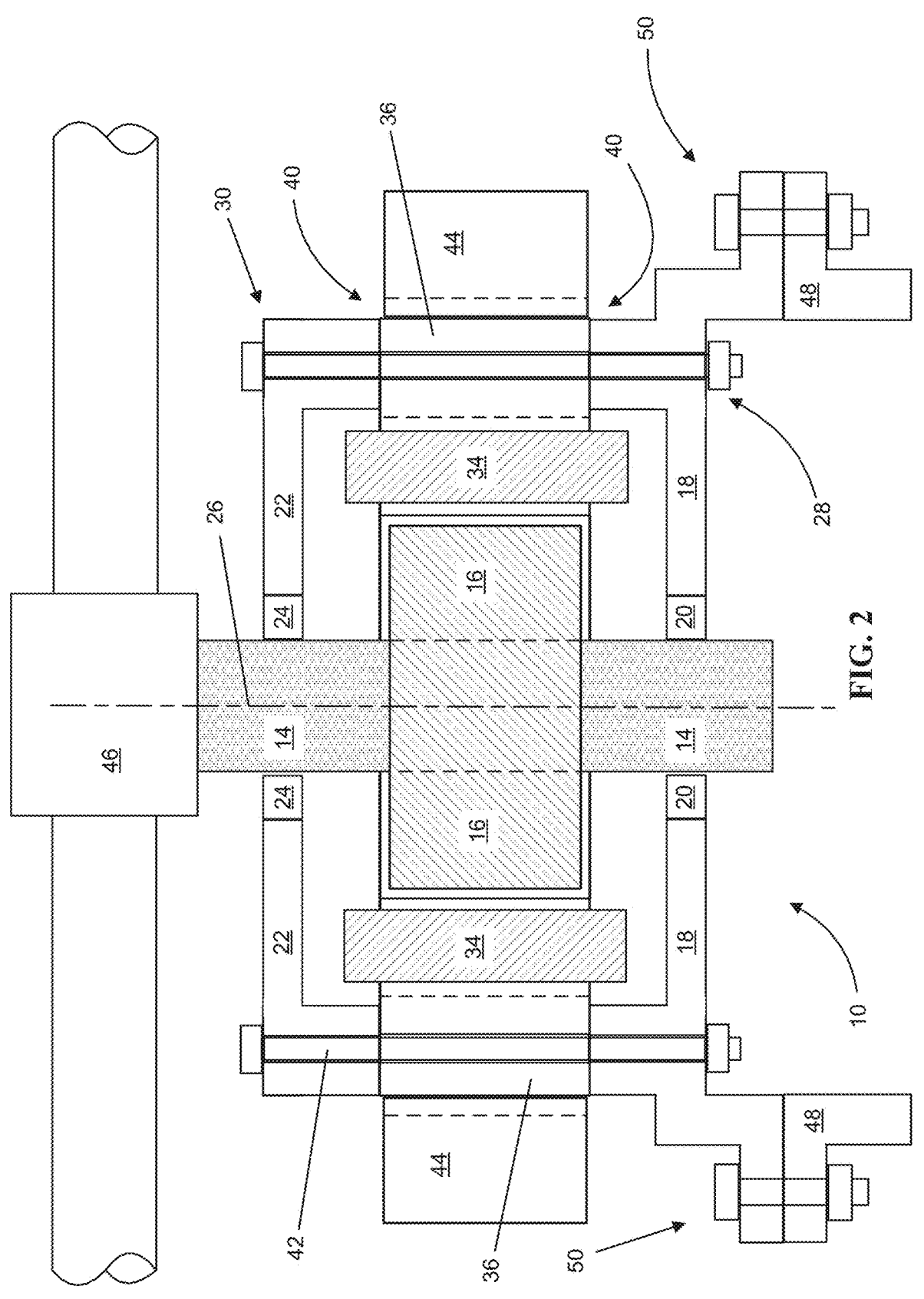
FIG. 2 shows a side cross-sectional schematic illustration of the electric motor of FIG. 1.
Figure 3:
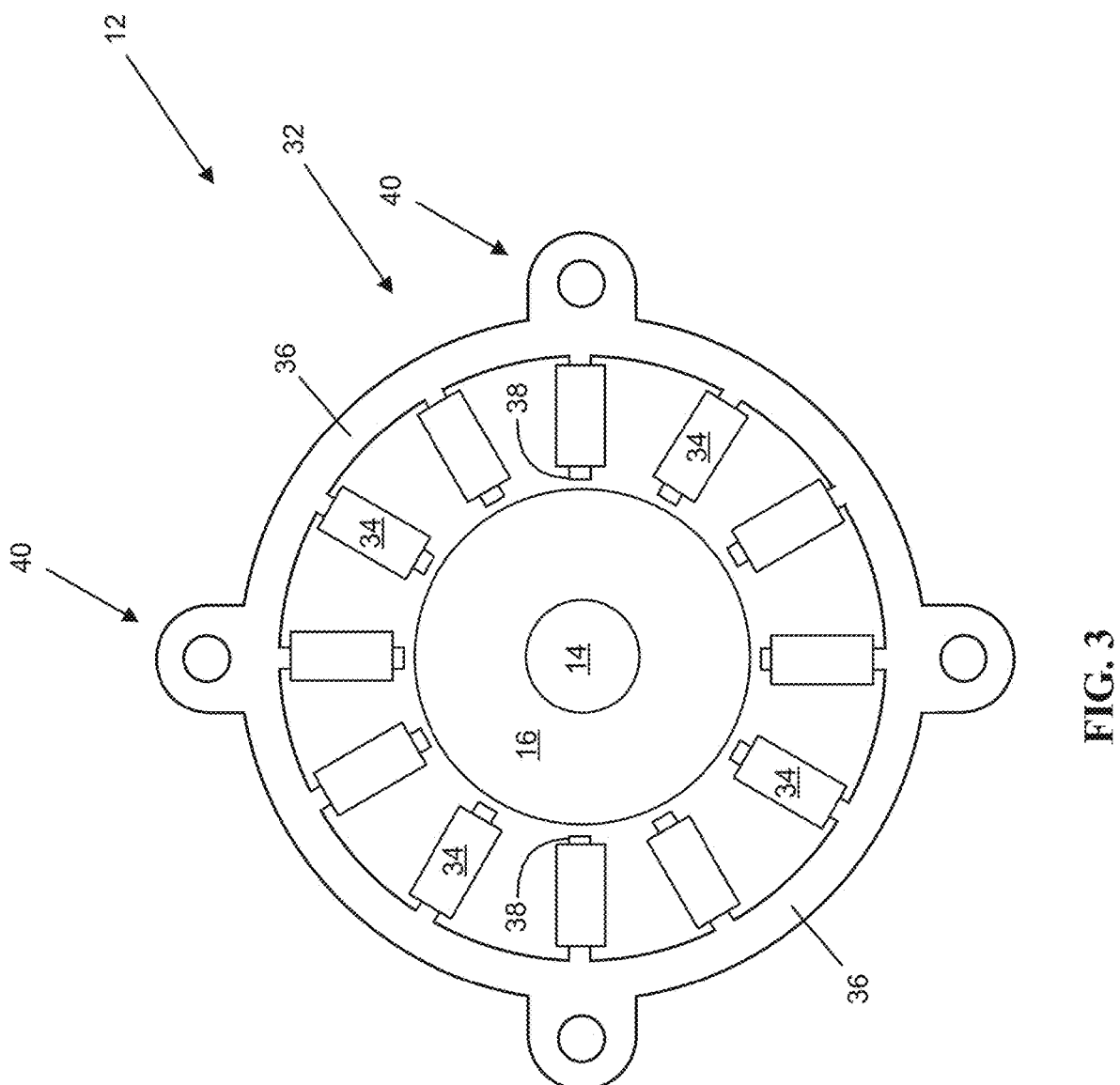
FIG. 3 shows a partial top view of the stator assembly of the electric motor of FIG. 1.

Turning now the drawing figures in which similar reference-identifiers refer to similar features, FIG. 1 shows a partial cross-sectional view of an electric motor 10, in accordance with embodiments. FIG. 2 shows a side cross-sectional schematic illustration of the electric motor 10. FIG. 3 shows a partial top view of the stator assembly 12 of the electric motor 10. The electric motor 10 includes an output shaft 14, a rotor 16, a first housing 18, a first bearing assembly 20, a second housing 22, a second bearing assembly 24, and the stator assembly 12. The output shaft 14 has an output shaft rotational axis 26. The rotor 16 is coupled to the output shaft 14 for driving rotation of the output shaft 14. The first housing 18 includes first housing-to-stator attachment features 28. The first bearing assembly 20 is coupled to the first housing 18 and interfaced with a first section the output shaft 14. The second housing 22 includes second housing-to-stator attachment features 30. The second bearing assembly 24 is coupled to the second housing 22 and interfaced with a second section the output shaft 14.

The stator assembly 12 includes a stator core 32 and stator coils 34. The stator core 32 includes a stator back iron 36, stator teeth 38, and stator-to-housing attachment features 40. The stator back iron 36 extends circumferentially around the output shaft rotational axis 26. The second housing 22 is coupled to the first housing 18 by the stator core 32 via the second housing-to-stator attachment features 30, the first housing-to-stator attachment features 28, and the stator-to-housing attachment features 40. One or more interface forces applied to the second bearing assembly 24 by the second section of the output shaft 14 are transferred to the first housing 18 by the stator back iron 36 and the stator-to-housing attachment features 40. Each of the stator teeth 38 extend radially inwardly from the stator back iron 36. Each of the stator coils 34 extends circumferentially around a respective one of the stator teeth 38.

The stator core 32 forms part of a load path through which loads applied to the second bearing assembly 24 by the output shaft 14 are transferred to a mounting base 48. The first bearing assembly 20 is configured to react one or more first bearing assembly radial loads from the first section of the output shaft 14 into the first housing 18, which transfers the one or more first bearing assembly radial loads received from the first bearing assembly 20 to the mounting base 48. Each of the one or more first bearing assembly radial loads is oriented radially relative to the output shaft rotational axis 26. The first bearing assembly 20 is configured to react a thrust load from the output shaft 14 into the first housing 18, which then transfers the thrust load to the mounting base 48.

The thrust load is aligned with the output shaft rotational axis 26. The second bearing assembly 24 is configured to react one or more second bearing assembly radial loads from the second section of the output shaft 14 into the second housing 22, which transfers the one or more second bearing assembly radial loads to the structural stator core 32 via the bolted connection of the second housing 22 to the structural stator core 32 via the second housing-to-stator attachment features 30 and the stator-to-housing attachment features 40 of the structural stator core 32. The structural stator core 32 transfers internal loads induced by the one or more second bearing assembly radial loads to the first housing 18, which transfers internal loads induced by the one or more second bearing assembly radial loads to the mounting base 48. Each of the one or more second bearing assembly radial loads is oriented radially relative to the output shaft rotational axis 26. The first housing 18 includes one or more motor mounting features 50 configured for mounting the electric motor 10 to the mounting base 48.

The electric motor 10 includes stator attachment bolts 42 that are used to fasten the first housing 18 and the second housing 22 to the stator core 32. The stator-to-housing attachment features 40 include stator-to-housing attachment fastener holes. The first housing-to-stator attachment features 28 include first housing-to-stator attachment fastener holes. The second housing-to-stator attachment features 30 include second housing-to-stator attachment fastener holes. Each of the stator attachment bolts 42 extends through a respective one of the first housing-to-stator attachment fastener holes, a respective one of the second housing-to-stator attachment fastener holes, and a respective one of the stator-to-housing attachment fastener holes.

The electric motor 10 includes cooling fins 44 attached to an outer-circumferential surface of the stator back iron 36. The cooling fins 44 can be thermally coupled with the stator back iron 36 using any suitable approach. For example, the cooling fins 44 can be bonded to the outer-circumferential surface of the stator back iron 36 via a suitable thermally conductive adhesive.

The stator assembly 12 is operable to generate magnetic fields that rotate the rotor 16 to rotate the output shaft 14 around the output shaft rotational axis 26. The rotor 16 can have any suitable configuration for interacting with the magnetic fields generated by the coils 34 of the stator assembly 12. For example, in some embodiments, the rotor 16 includes permanent magnets that interact with the magnetic fields to drive rotation of the rotor 16 to rotate the output shaft 14 around the output shaft rotational axis 26.

The stator core 32 can have any suitable configuration. For example, in many embodiments, the stator back iron 36, the stator teeth 38, and the stator-to-housing attachment features 40 are integrally formed of a suitable magnetically permeable material.

The electric motor 10 can be configured for use in any suitable application. For example, the output shaft 14 can be drivingly coupled with a lift fan 46 of an aircraft.

FIG. 4 is a simplified block diagram of a method 200 of supporting an output shaft of an electric motor in which a stator assembly forms part of the support structure for the output shaft, in accordance with embodiments. The method 200 includes: (a) supporting the output shaft with a first bearing assembly and a second bearing assembly offset from the first bearing assembly along a rotational axis of the output shaft (act 202), (b) supporting the first bearing assembly via a first housing to which the first bearing assembly is coupled (act 204), (c) supporting the first housing via a mounting base via attachment of the first housing to the mounting base (act 206), (d) supporting the second bearing assembly via a second housing to which the second bearing assembly is coupled, wherein the second housing is offset from the first housing along the rotational axis of the output shaft (act 208), (e) supporting a stator assembly by the first housing via attachment of a first end of the stator assembly to the first housing (act 210), and (f) supporting the second housing by the stator assembly via attachment of the second housing to a second end the stator assembly, wherein the second end of the stator assembly is opposite to the first end of the stator assembly (act 212).

In many embodiments, the method 200 includes transmitting loads from the output shaft to the mounting base through the stator assembly. For example, in many embodiments, the method 200 includes transmitting a first bearing assembly load from the output shaft to the mounting base through a first load path that extends through the first bearing assembly and the first housing to the mounting base and transmitting a second bearing assembly load from the output shaft to the mounting base through a second load path that extends through the second bearing assembly, the second housing, the stator assembly, and the first housing to the mounting base. In many embodiments of the method 200, the second bearing assembly load is oriented radially relative to the rotational axis of the output shaft, the first bearing assembly load includes a radial load component and a thrust load component, the radial load component is oriented radially relative to the rotational axis of the output shaft, and the thrust load component is aligned with the rotational axis of the output shaft.

Any suitably configured electric motor can be used to practice the method 200 including the electric motor 10 described herein. For example, in some embodiments, the stator assembly includes a structural stator core member and stator coils. In some embodiments, the structural stator core member includes a stator back iron, stator teeth, and stator-to-housing attachment features. The structural stator core member can be coupled to and between the first housing and the second housing via the stator-to-housing attachment features of the structural stator core member.

The method 200 can be practiced via an electric motor employed in any suitable application. For example, the method 200 can be practiced via an electric motor employed in an aircraft. The output shaft can be drivingly coupled with a lift fan of the aircraft, for example.

FIG. 5 is a simplified block diagram of a method 300 of cooling an electric motor using cooling fins that are attached to a stator assembly of the electric motor, in accordance with embodiments. The method 300 includes: (a) supporting a first bearing assembly for an output shaft of the electric motor via a first housing to which the first bearing assembly is coupled, (b) supporting a second bearing assembly for the output shaft via a second housing to which the second bearing assembly is coupled, (c) maintaining engagement between a first end of a stator assembly and the first housing via attachment of the first end of the stator assembly to the first housing, (d) maintaining engagement between a second end of the stator assembly and the second housing via attachment of the second end of the stator assembly to the second housing, (e) supporting cooling fins attached to the stator assembly so that the cooling fins are exposed to air that is not enclosed by the first housing, the second housing, and the stator assembly, and (f) cooling the electric motor by conducting heat from the stator assembly into the cooling fins.

Any suitably configured electric motor can be used to practice the method 300 including the electric motor 10 described herein. For example, in some embodiments, the stator assembly includes a structural stator core member and stator coils. The structural stator core member can include a stator back iron, stator teeth, and stator-to-housing attachment features. The stator back iron can extend circumferentially around a rotational axis of the output shaft. Each of the first housing and the second housing can be coupled to the stator core via the stator-to-housing attachment features of the structural stator core member and corresponding housing-to-stator attachment features of the first and second housings. The cooling fins can be thermally coupled to an outer-circumferential surface of the stator back iron. For example, the cooling fins can be thermally coupled to the outer-circumferential surface of the stator back iron via a thermally conductive adhesive.

Figure 6:
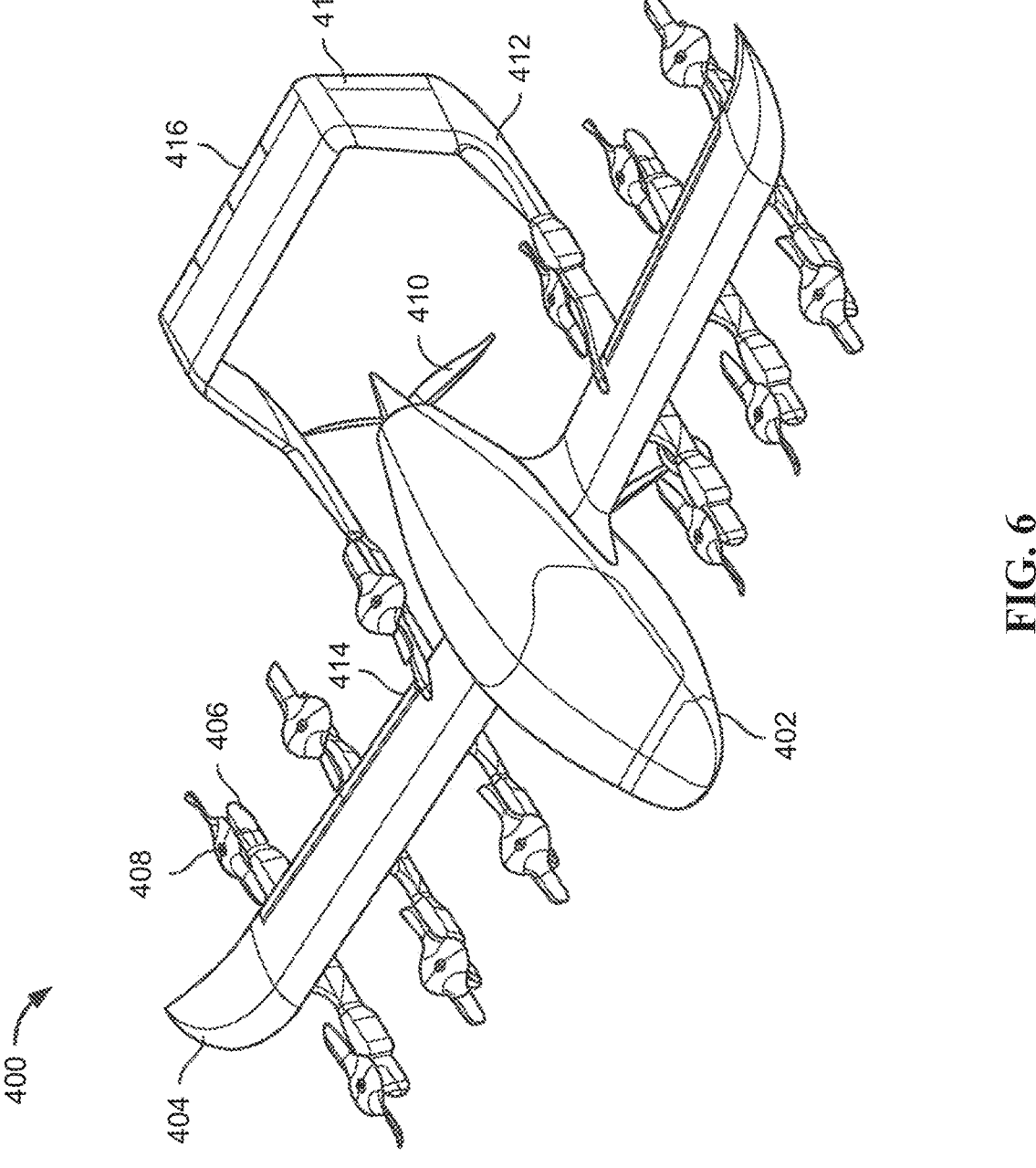
FIG. 6 shows an electrically powered aircraft including electric motors in accordance with the electric motor of FIG. 1.

The electric motor 10 can be employed in any suitable application such as, for example, cars, trucks, and especially in aircraft in view of the decreased weight of the electric motor 10 resulting from the weight savings provided by the use of the structural stator core 32. For example, FIG. 6 shows an example electrically powered aircraft 400 that can include one or more of the electric motor 10, in accordance with embodiments. The electrically powered aircraft 400 includes a fuselage (body) 402 and wings 404. A set of three underwing pylons 406 is provided under each wing. Each pylon 406 has two lift fans 408 mounted thereon, one forward of the wing and one aft. One or more batteries (not shown) and/or onboard power generators (e.g., solar panels) may be used to power the electric motor 10 to drive the lift fans 408 and/or charge/recharge onboard batteries. A propeller 410 is mounted on the fuselage 402 and configured to push the aircraft through the air in the forward (e.g., x axis) direction. The propeller 410 is positioned between a pair of booms 412 that extend aft and are joined at their aft end by a tail structure on which aerodynamic control surfaces including elevators 416 and rudder 418 are mounted. Additional control surfaces include ailerons 414 mounted on the trailing edge of wings 404. Each of the lift fans 408, the propeller 410, the ailerons 414, the elevators 416, and the rudder 418 can be driven by any suitable associated drive mechanism, which can include the electric motor 10.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An electric motor comprising:
an output shaft having an output shaft rotational axis;
a rotor coupled to the output shaft;
a first housing comprising first housing-to-stator attachment features;
a first bearing assembly coupled to the first housing and interfaced with a first section of the output shaft;
a second housing comprising second housing-to-stator attachment features;
a second bearing assembly coupled to the second housing and interfaced with a second section the output shaft;
a stator assembly comprising a stator core and stator coils, wherein the stator core comprises a stator back iron, stator teeth, and stator-to-housing attachment features, wherein the second housing is coupled to the first housing by the stator core via the second housing-to-stator attachment features, the first housing-to-stator attachment features, and the stator-to-housing attachment features; wherein the stator back iron extends circumferentially around the output shaft rotational axis and is configured to react one or more interface forces applied to the second bearing assembly by the second section of the output shaft to the first housing, wherein each of the stator teeth extend radially inward toward the output shaft rotational axis from the stator back iron; and wherein each of the stator coils extends circumferentially around a respective one of the stator teeth; and
cooling fins bonded to an outer-circumferential surface of the stator back iron via a thermally conductive adhesive.

2. The electric motor of claim 1, wherein:
the first bearing assembly is configured to react one or more first bearing assembly radial loads from the first section of the output shaft into the first housing;

each of the one or more first bearing assembly radial loads is oriented radially relative to the output shaft rotational axis;
the first bearing assembly is configured to react a thrust load from the output shaft into the first housing; and
the thrust load is aligned with the output shaft rotational axis.

3. The electric motor of claim 2, wherein:
the second bearing assembly is configured to react one or more second bearing assembly radial loads from the second section of the output shaft into the second housing; and
each of the one or more second bearing assembly radial loads is oriented radially relative to the output shaft rotational axis.

4. The electric motor of claim 3, wherein the first housing comprises one or more motor mounting features configured for mounting the electric motor to a mounting base.

5. The electric motor of claim 1, further comprising stator attachment bolts and wherein:
the stator-to-housing attachment features comprise stator-to-housing attachment fastener holes;
the first housing-to-stator attachment features comprise first housing-to-stator attachment fastener holes;
the second housing-to-stator attachment features comprise second housing-to-stator attachment fastener holes; and
each of the stator attachment bolts extends through a respective one of the first housing-to-stator attachment fastener holes, a respective one of the second housing-to-stator attachment fastener holes, and a respective one of the stator-to-housing attachment fastener holes.

6. The electric motor of claim 1, wherein the rotor comprises permanent magnets.

7. The electric motor of claim 1, wherein the stator back iron, the stator teeth, and the stator-to-housing attachment features are formed of a magnetically permeable material.

8. An aircraft comprising the electric motor of claim 1.

9. The aircraft of claim 8, wherein the output shaft is drivingly coupled with a lift fan of the aircraft.

10. A method of supporting an output shaft of an electric motor, the method comprising:
supporting the output shaft with a first bearing assembly and a second bearing assembly offset from the first bearing assembly along a rotational axis of the output shaft;
supporting the first bearing assembly via a first housing to which the first bearing assembly is coupled;
supporting the first housing via a mounting base via attachment of the first housing to the mounting base;
supporting the second bearing assembly via a second housing to which the second bearing assembly is coupled, wherein the second housing is offset from the first housing along the rotational axis of the output shaft;
supporting a stator assembly by the first housing via attachment of a first end of the stator assembly to the first housing; and
supporting the second housing by the stator assembly via attachment of the second housing to a second end the stator assembly, wherein the second end of the stator assembly is opposite to the first end of the stator assembly; and
attaching cooling fins to an outer-circumferential surface of a stator back iron, wherein the cooling fins are bonded to the outer-circumferential surface via a thermally conductive adhesive.

11. The method of claim 10, further comprising:

transmitting a first bearing assembly load from the output shaft to the mounting base through a first load path that extends through the first bearing assembly and the first housing to the mounting base; and transmitting a second bearing assembly load from the output shaft to the mounting base through a second load path that extends through the second bearing assembly, the second housing, the stator assembly, and the first housing to the mounting base.

12. The method of claim 11, wherein:

the second bearing assembly load is oriented radially relative to the rotational axis of the output shaft;

the first bearing assembly load comprise a radial load component and a thrust load component;

the radial load component is oriented radially relative to the rotational axis of the output shaft; and the thrust load component is aligned with the rotational axis of the output shaft.

13. The method of claim 10, wherein:

the stator assembly comprises a stator core and stator coils;

the stator core comprises a stator back iron, stator teeth, and stator-to-housing attachment features; and the stator core is coupled with and between the first housing and the second housing via the stator-to-housing attachment features.

14. The method of claim 10, wherein the output shaft is drivingly coupled with a lift fan of an aircraft.

15. A method of cooling an electric motor, the method comprising:

supporting a first bearing assembly for an output shaft of the electric motor via a first housing to which the first bearing assembly is coupled;

supporting a second bearing assembly for the output shaft via a second housing to which the second bearing assembly is coupled;

maintaining engagement between a first end of a stator assembly and the first housing via attachment of the first end of the stator assembly to the first housing;

maintaining engagement between a second end of the stator assembly and the second housing via attachment of the second end of the stator assembly to the second housing;

supporting cooling fins attached to the stator assembly so that the cooling fins are exposed to air that is not enclosed by the first housing, the second housing, and the stator assembly; and cooling the electric motor by conducting heat from the stator assembly into the cooling fins, wherein the cooling fins are thermally coupled to an outer-circumferential surface of a stator back iron via a thermally conductive adhesive.

16. The method of claim 15, wherein:

the stator assembly comprises a stator core and stator coils;

wherein the stator core comprises a stator back iron, stator teeth, and stator-to-housing attachment features;

the stator back iron extends circumferentially around a rotational axis of the output shaft; and each of the first housing and the second housing is coupled with the stator core via the stator-to-housing attachment features.

* * * * *